April 15, 1924.

C. H. WAGNER

DRAIN GATE

Filed June 13, 1922

1,490,150

Inventor
C. H. Wagner.

By Lacy & Lacy, Attorneys

Patented Apr. 15, 1924.

1,490,150

UNITED STATES PATENT OFFICE.

CHRISTIAN H. WAGNER, OF TIFFIN, OHIO.

DRAIN GATE.

Application filed June 13, 1922. Serial No. 568,034.

*To all whom it may concern:*

Be it known that I, CHRISTIAN H. WAGNER, citizen of the United States, residing at Tiffin, in the county of Seneca and State of Ohio, have invented certain new and useful Improvements in Drain Gates, of which the following is a specification.

This invention relates to an improved drain gate for automobile radiators, crank cases, or the like, and seeks, as one of its principal objects, to provide a device of this character embodying a valve which will not stick and may, accordingly, be always easily opened or closed.

A further object of the invention is to provide a device wherein the valve will be spring pressed for avoiding leakage.

Another object of the invention in this connection, is to provide a device embodying a swingingly mounted valve journaled upon a supporting screw and wherein the screw will also serve to retain the spring acting against the valve.

And the invention has as a still further object to provide a device wherein an operating rod may be engaged with either one end or the other of the valve to extend forwardly or rearwardly with respect to the valve as circumstances may demand so that, regardless of space limitations imposed by adjacent objects, the rod may be readily engaged with the valve for manipulating the valve.

Other and incidental objects will appear hereinafter.

Figure 1:
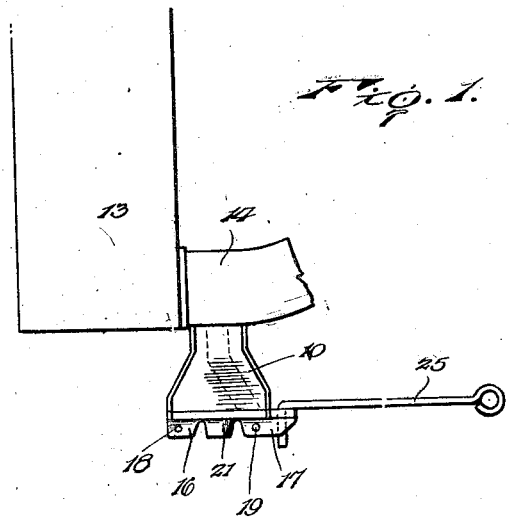
Figure 2:
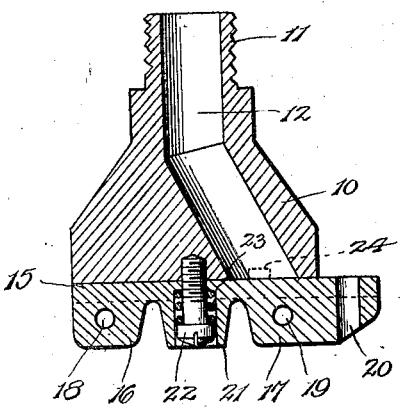
Figure 3:
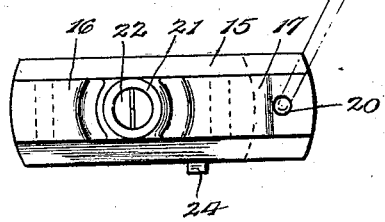
Figure 4:
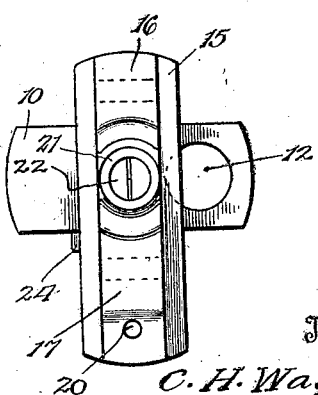

Figure 1 is a side elevation showing my improved drain gate in connection with an automobile radiator, Figure 2 is a vertical sectional view showing the drain gate closed, Figure 3 is a bottom plan view of the drain gate, and Figure 4 is a bottom plan view showing the drain gate open.

Referring now more particularly to the drawing, it will be seen that I employ an oblong valve body 10 which is tapered toward its upper end and is preferably provided with flat sides. Formed on the valve body at its upper terminal is an upstanding nipple 11 through which extends a passage 12 leading through the lower face of the valve body near one end thereof, the passage being provided with angularly disposed portions. The nipple 11 is designed to be engaged with the object to be drained and, in Figure 1 of the drawing, I have illustrated the device in connection with a conventional motor vehicle radiator 13, from the lower end of which leads the usual outlet pipe 14. As shown, the nipple 11 is threaded into the outlet pipe at its lower side for connecting the body 10 thereto.

The body 10 is formed with a flat and smooth lower face and mounted upon the body is an oblong valve 15. This valve is of a width equal to the width of the body but, as shown in Figure 2, is somewhat longer than the body at its lower end so that the valve thus overhangs the body and formed on the valve at its ends are upstanding lugs 16 and 17 through which are provided transverse openings 18 and 19 respectively. Further, the lug 17 is provided with a vertically disposed opening 20 extending through the overhanging end of the valve. Formed on the valve between the lugs 16 and 17 is an upstanding annular hub flange 21 and housed by said flange is a pivot screw 22 extending freely through the valve and threaded into the body 10 rotatably supporting the valve. The valve is provided with a flat and smooth upper face to seat against the flat bottom face of the body 10 and surrounding the screw within the flange 21 is a spring 23 pressing the valve against the valve body. Thus, the valve will be held tight against the lower face of the body normally overlying the passage 12, closing the passage. However, the valve may, as will be perceived, be readily rotated to uncover the passage so that water may flow through the passage from the pipe 14 for draining the radiator. Formed on an edge of the valve, near one end thereof, is a stop lug 24 which, as shown in Figure 3, is adapted to engage the adjacent side face of the body 10 for limiting the valve in closed position and is also adapted, as shown in Figure 4, to engage said face of the body for limiting the valve in open position.

In conjunction with the valve, I preferably employ an operating rod 25 bent at its forward end to engage the valve. In any instance where the location of adjacent objects will permit, the forward terminal of the rod may, as shown in Figure 1, be engaged through the opening 20 in the overhanging end of the valve so that the rod may be manipulated for rotating the valve to open and closed position. However, should this not be possible, the forward terminal of the rod may be engaged through either one of the openings 18 and 19 of the valve to extend either forwardly or rearwardly with respect to the valve, as dictated by circumstances. Thus, provision is made whereby the rod may always be conveniently engaged with the valve for manipulating the valve and, if found desirable, two rods, similar to the rod 25, may be employed and engaged with opposite ends of the valve, one rod being used for opening the valve and the other rod being used for closing the valve.

Having thus described the invention, what is claimed as new is:

A drain gate including a valve body widened toward its outer end and provided with an axial passage deflected at its outer end portion to open through the widened end of the valve body near one extremity thereof, and an oblong valve fitting the widened end of the body to normally overlie said passage and pivoted centrally to the widened end of the valve body axially of the body, the valve being formed at opposite sides of its pivot point with upstanding longitudinal reinforcing lugs transversely apertured to selectively receive an operating rod and said valve having one end thereof overhanging the valve body and apertured at substantially a right angle to the apertures of said lugs to receive an operating rod.

In testimony whereof I affix my signature.

CHRISTIAN H. WAGNER. [L. S.]